(12) United States Patent
Suzuki et al.

(10) Patent No.: US 7,159,558 B2
(45) Date of Patent: Jan. 9, 2007

(54) ENGINE HAVING CENTRALIZED MASS

(75) Inventors: Mamoru Suzuki, Shizuoka (JP);
Masashi Omoto, Shizuoka (JP);
Tatsuya Masuda, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 74 days.

(21) Appl. No.: 11/173,458

(22) Filed: Jul. 1, 2005

(65) Prior Publication Data

US 2006/0005799 A1    Jan. 12, 2006

(30) Foreign Application Priority Data

Jul. 8, 2004    (JP)    ............................. 2004-201611

(51) Int. Cl.
*F02B 75/06*    (2006.01)
*F02B 75/24*    (2006.01)
(52) U.S. Cl. ................................. 123/192.2; 123/53.1
(58) Field of Classification Search ............. 123/192.2, 123/53.1–53.5, 197.1, 197.4
See application file for complete search history.

(56) References Cited

U.S. PATENT DOCUMENTS

| | | | | |
|---|---|---|---|---|
| 4,945,866 A | * | 8/1990 | Chabot, Jr. ................. | 123/53.1 |
| 5,076,220 A | * | 12/1991 | Evans et al. .............. | 123/197.4 |
| 5,218,885 A | * | 6/1993 | Nakano et al. ........... | 123/192.1 |
| 5,816,201 A | * | 10/1998 | Garvin ..................... | 123/197.3 |
| 6,615,794 B1 | * | 9/2003 | Baika et al. .............. | 123/197.4 |

FOREIGN PATENT DOCUMENTS

JP    06-89813 B    11/1994

* cited by examiner

*Primary Examiner*—Noah P. Kamen
(74) *Attorney, Agent, or Firm*—Keating & Bennett, LLP

(57) ABSTRACT

An engine is constructed such that respective centers of gravity of a crank shaft, a balancer shaft and a cylinder are positioned close to one another and the mass of the engine is thus centralized. The engine includes a shaft center of a cylinder that is offset to one side with respect to a shaft center of a crank shaft, and a balancer shaft is disposed on a side of the engine where the cylinder shaft center is offset with respect to a first parallel line which intersects with the crank shaft center and extends substantially parallel to the cylinder shaft center.

20 Claims, 7 Drawing Sheets

ENGINE HAVING CENTRALIZED MASS

BACKGROUND OF THE INVENTION

1. Field of the Invention

The present invention relates to an engine included in a saddle type vehicle such as a motorcycle, a tricycle or other vehicle, and more particularly, the present invention relates to an engine having a balancer shaft.

2. Description of the Related Art

A conventional engine included in a saddle type vehicle or the like has a crank shaft, and a piston is connected to the crank shaft via a connecting rod. When the piston moves up and down within a cylinder, the crank shaft is rotated via the connecting rod.

A balancer shaft and a main shaft engaging with the crank shaft are disposed in the vicinity of the crank shaft.

The balancer shaft has a balancer gear and a balancer weight. The balancer shaft is rotatably supported by a pair of bearings provided on a crank case.

The balancer gear engages with a crank gear of the crank shaft. The balancer gear has the same diameter as that of the crank gear.

The crank shaft and the main shaft are connected with each other via a clutch mechanism such that a driving force provided by the crank shaft is transmitted to the main shaft through the clutch mechanism.

The main shaft has a plurality of shift gears. A gear is arbitrarily selected from the plurality of shift gears and brought into engagement with a gear of a drive shaft, thereby providing variable speed control. See, for example, JP-B-06-89813.

In the conventional engine of this type, however, the respective centers of gravity of the crank shaft, balancer shaft and cylinder are spaced away from one another. It is thus impossible to centralize the mass.

SUMMARY OF THE INVENTION

In order to solve the problems described above, preferred embodiments of the present invention provide an engine in which the respective centers of gravity of a crank shaft, a balancer shaft and a cylinder are positioned close to one another such that the mass can be centralized.

According to a preferred embodiment of the present invention, an engine includes a shaft center of a cylinder that is offset to one side with respect to a shaft center of a crank shaft, and a balancer shaft that is disposed on a side where the cylinder shaft center lies with respect to a first parallel line which intersects with the crank shaft center and extends substantially parallel to the cylinder shaft center.

A balancer weight rotational track of the balancer shaft is preferably disposed close to the lower end of the cylinder.

The balancer weight rotational track is preferably disposed between a first vertical line which is substantially perpendicular to the first parallel line and passes the lower end of the cylinder and a second vertical line vertically extending from an intersection between the first parallel line and a crank web rotational track.

A main shaft and a drive shaft are preferably disposed on a side that is opposite to the side where the balancer shaft is positioned with respect to the first parallel line.

A starter motor is preferably disposed on the side opposite to the side where the balancer shaft is positioned with respect to the first parallel line, and the starter motor is disposed in the vicinity of the lower end of the cylinder.

The starter motor, the main shaft and the drive shaft are preferably located on the side opposite to the side where the balancer shaft is positioned with respect to the first parallel line such that the starter motor, the main shaft and the drive shaft are arranged in this order from the vicinity of the lower end of the cylinder.

According to the present preferred embodiment, the shaft center of the cylinder is offset to one side with respect to the shaft center of the crank shaft, and the balancer shaft is disposed on the side where the cylinder shaft center lies with respect to the first parallel line which intersects with the crank shaft center and extends substantially parallel to the cylinder shaft center. Since the balancer shaft is disposed close to the cylinder shaft center, the respective centers of gravity of the crank shaft, balancer shaft and cylinder are positioned close to one another and the mass is thus centralized.

The balancer weight rotational track of the balancer shaft is also positioned close to the lower end of the cylinder. Thus, the mass can be further centralized.

Further, the main shaft and the drive shaft are preferably disposed on the side opposite to the side where the balancer shaft is positioned with respect to the first parallel line. As a result, balanced disposition of those shafts is achieved and thus, the mass is further centralized. Also, since the balancer shaft does not interfere with the main shaft, the main shaft can be disposed in an upper position. This positioning prevents a clutch mechanism provided at the end of the main shaft from dipping into the oil.

The starter motor is preferably disposed on the side opposite to the side where the balancer shaft is positioned with respect to the first parallel line, and the starter motor is disposed in the vicinity of the lower end of the cylinder. As a result, a compact arrangement of the components is achieved and thus, the mass is centralized. Also, the front-to-rear length of the engine can be reduced.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Preferred embodiments according to the present invention are hereinafter described.

First Preferred Embodiment

FIGS. 1 through 5 illustrate a first preferred embodiment according to the present invention.

Figure 1:
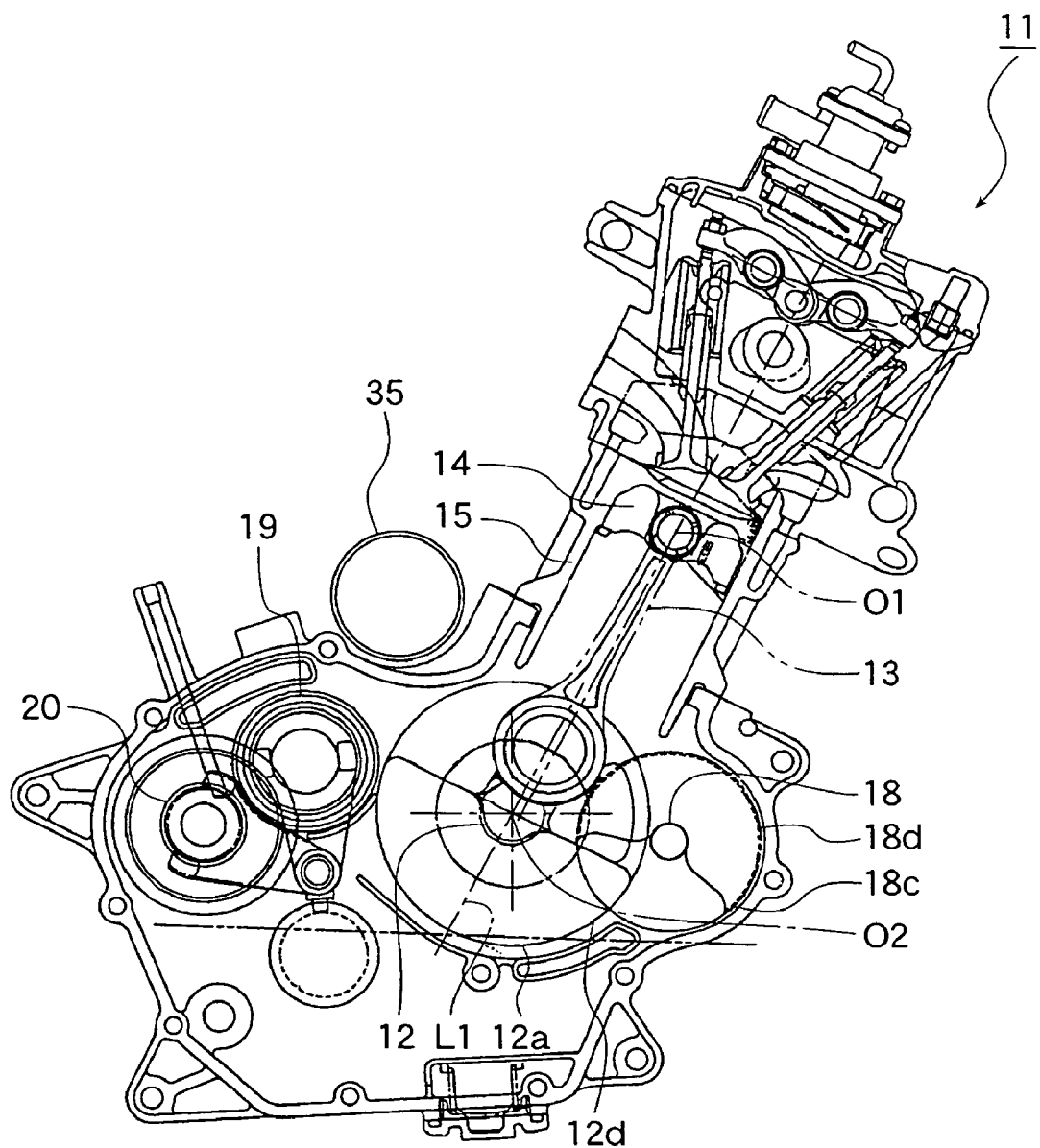
FIG. 1 is a schematic side view of an engine included in a saddle type vehicle according to a first preferred embodiment of the present invention.
Figure 2:
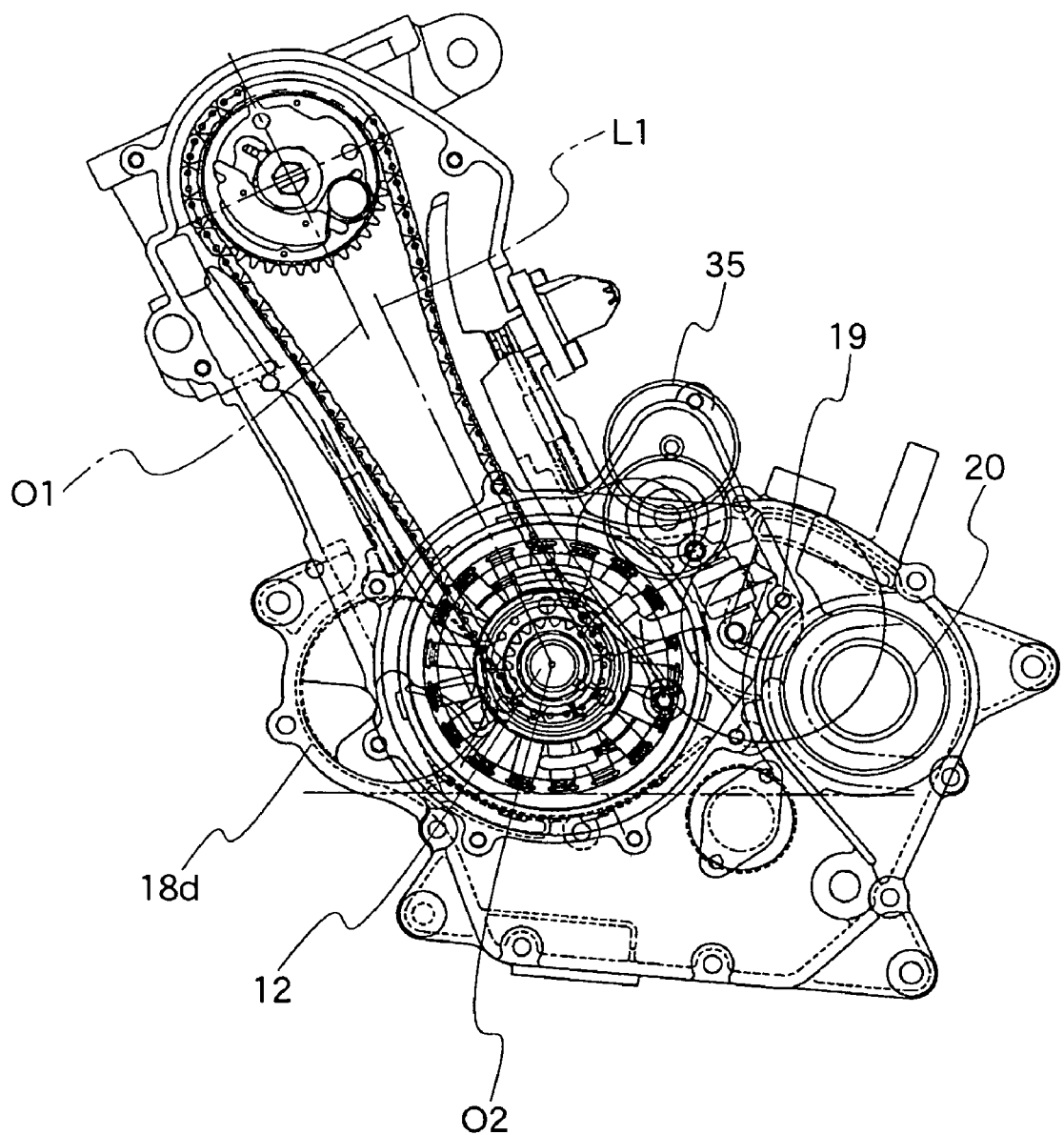
FIG. 2 is a schematic side view of the engine according to the first preferred embodiment of the present invention as viewed from the side opposite to the side shown in FIG. 1.

A structure of an engine according to the first preferred embodiment of the present invention is initially discussed. A single-cylinder 4-cycle and 4-valve engine 11 included in a motorcycle as a saddle type vehicle is shown in FIG. 1. The engine 11 has a crank shaft 12, and a piston 14 is connected to the crank shaft 12 via a connecting rod 13.

When the piston 14 moves up and down within a cylinder 15, the crank shaft 12 is rotated around an axis extending along a vehicle width direction via the connecting rod 13.

A shaft center O1 of the cylinder 15 is offset to one side (vehicle front side) with respect to a shaft center O2 of the crank shaft 12 by a predetermined distance. Also, the shaft center O1 is inclined toward a front of the engine 11 by a predetermined angle. This offset reduces a horsepower loss caused when the piston 14 receives combustion pressure.

A balancer shaft 18 is disposed on the side where the shaft center O1 of the cylinder 15 lies with respect to a first parallel line L1 which intersects with the shaft center O2 of the crank shaft 12 and extends substantially parallel with the cylinder shaft center O1.

A main shaft 19 is provided on the side opposite to the side where the balancer shaft 18 is positioned with respect to the first parallel line L1. A drive shaft 20 is disposed in the vicinity of the lower region of the main shaft 19.

Figure 3:
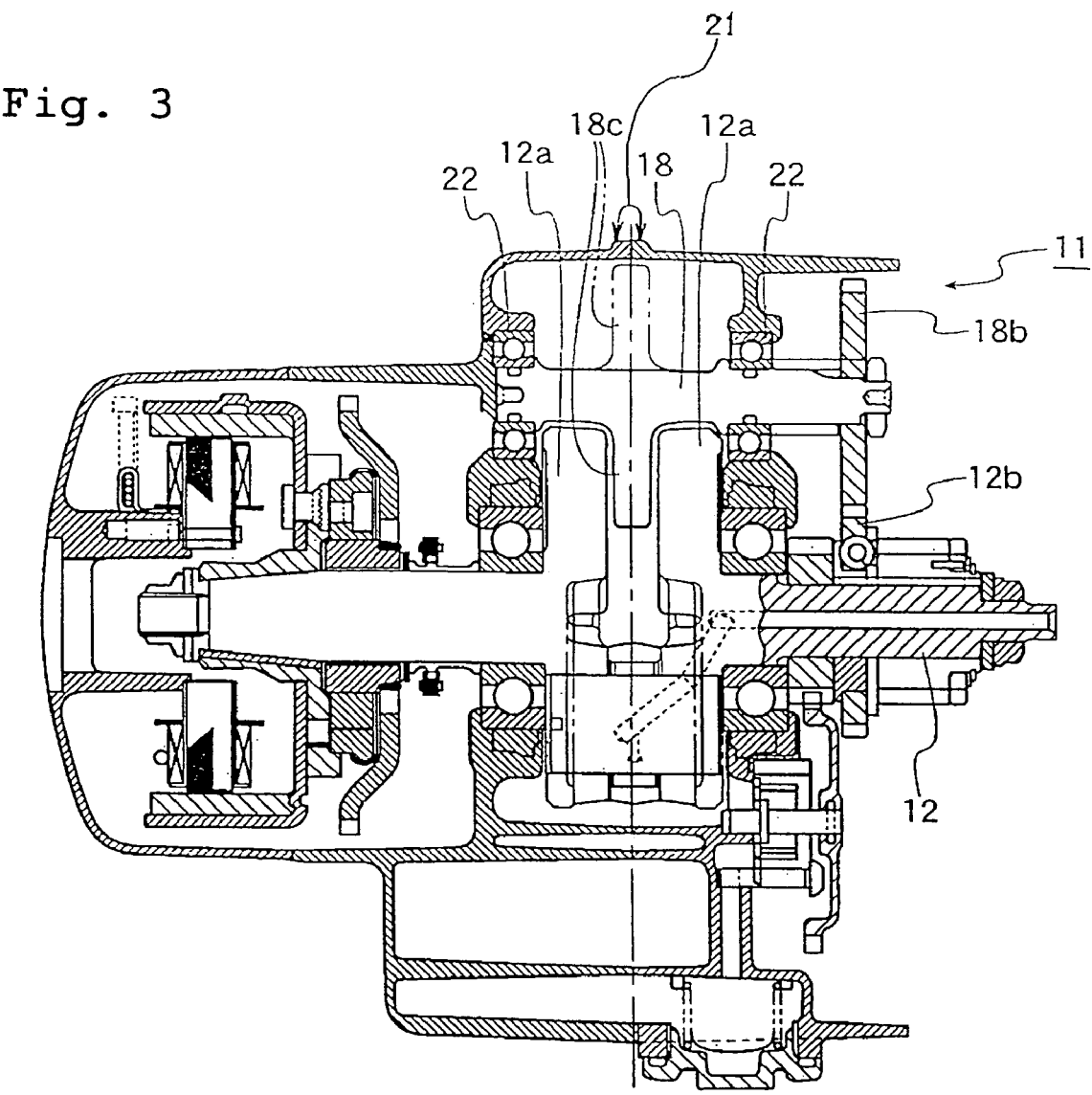
FIG. 3 is a schematic cross-sectional view illustrating a crank shaft, a balancer shaft, a starter motor and the like of the engine according to the first preferred embodiment of the present invention.

As illustrated in FIG. 3, the balancer shaft 18 has a balancer gear 18b and a balancer weight 18c. The balancer shaft 18 is rotatably supported by a pair of bearings 22 provided on a crank case 21. The balancer weight 18c is positioned between the pair of the bearings 22. The balancer gear 18b is disposed at the right end as viewed in FIG. 3.

Figure 5:
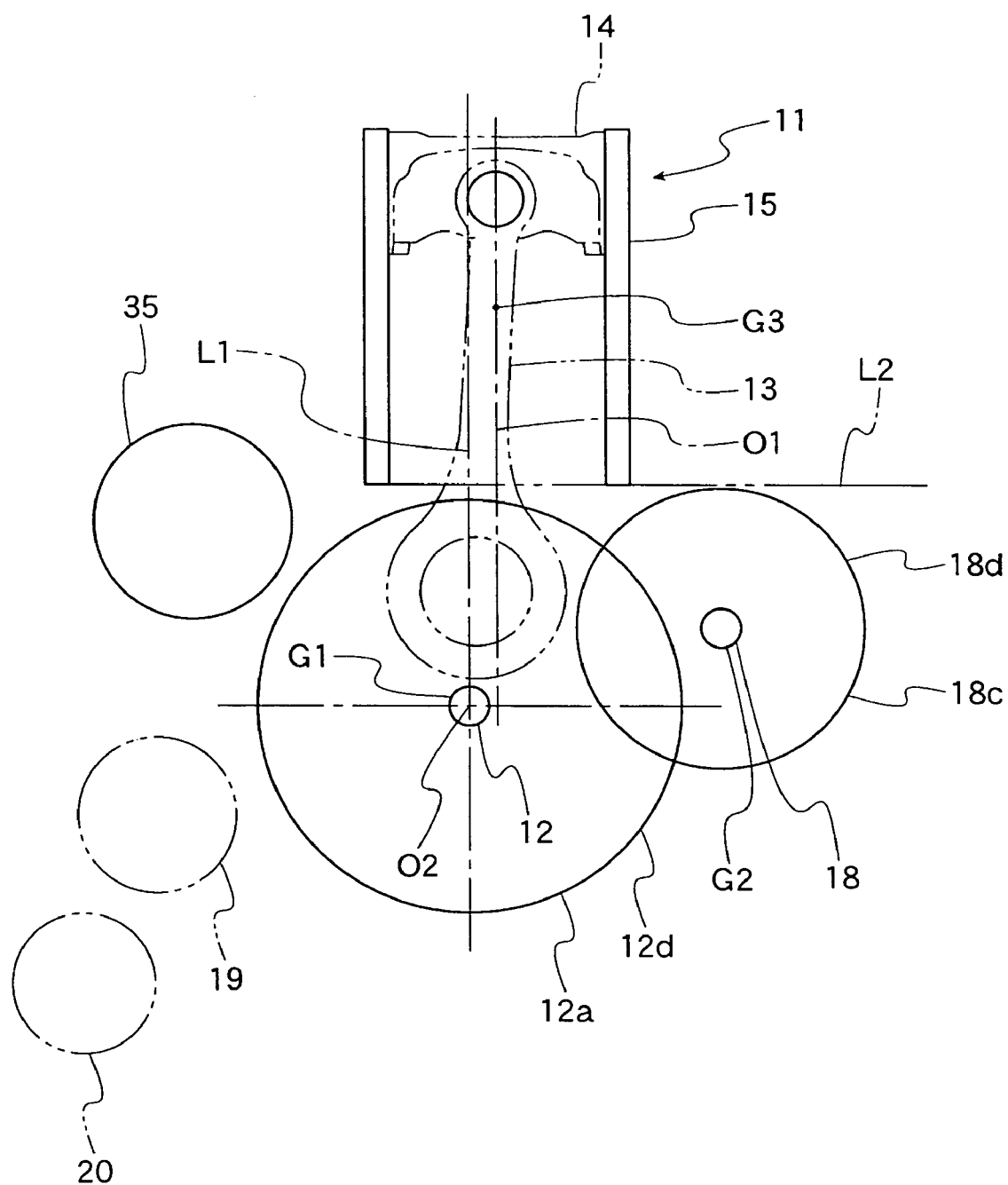
FIG. 5 is a schematic view illustrating a cylinder, a piston, a balancer weight and the like of the engine according to the first preferred embodiment of the present invention.

The balancer weight 18c is inserted between a pair of crank webs 12a of the crank shaft 12. A rotational track 18d of the balancer weight 18c and a rotational track 12d of the crank web 12a are arranged such that the two tracks 18d and 12d overlap with each other as viewed from the crank shaft 12. As illustrated in FIG. 5, the rotational track 18d of the balancer weight 18c is positioned close to the lower end of the cylinder 15, and is arranged between a first vertical line L2 which is substantially perpendicular to the first parallel line L1 and passes the lower end of the cylinder 15, and a second vertical line L3 which vertically extends from the intersection between the first parallel line L1 and a crank web rotational track 12d.

The balancer gear 18b engages with the crank gear 12b of the crank shaft 12. The crank gear 12b preferably has substantially the same diameter as that of the balancer gear 18b.

Figure 4:
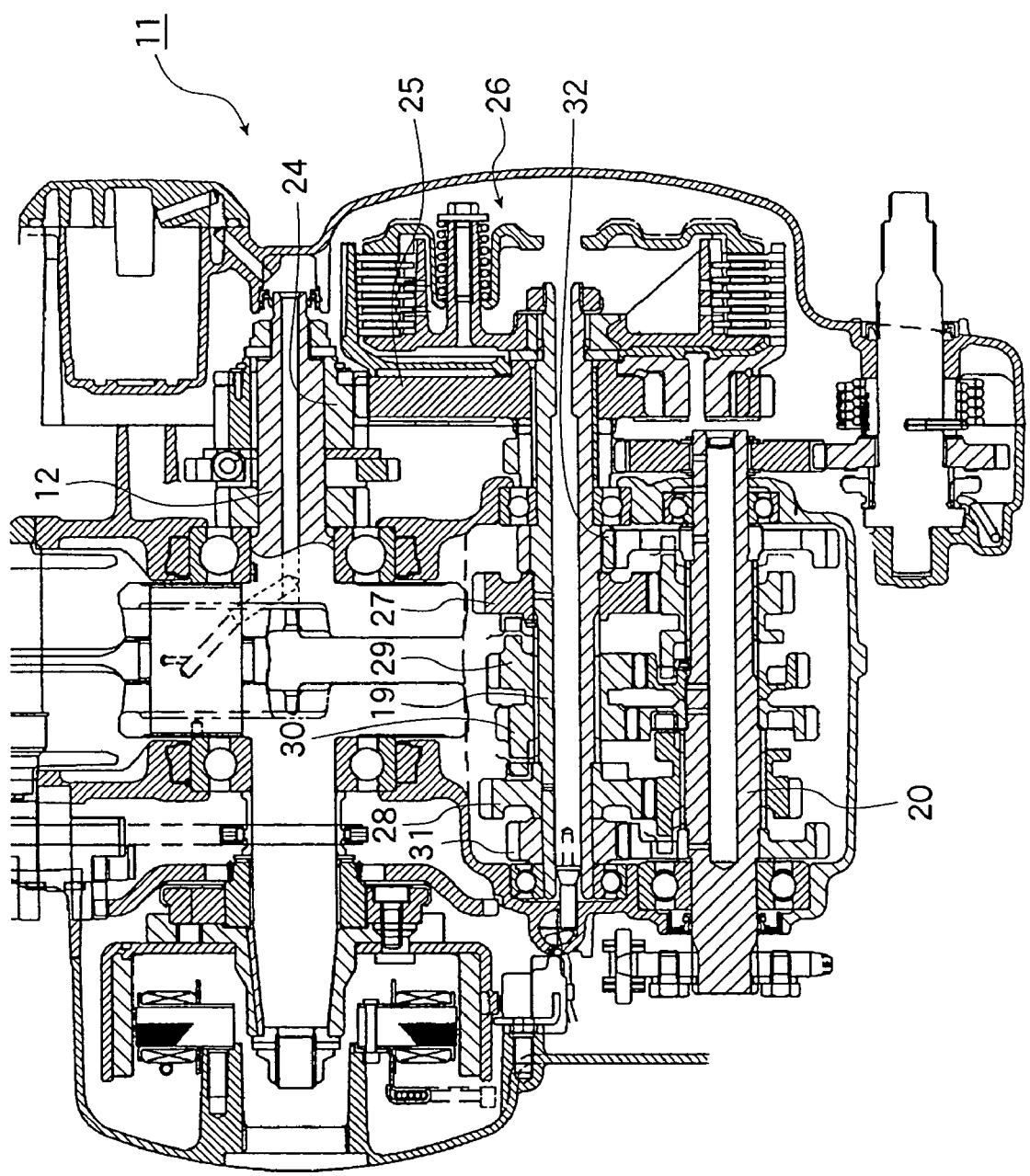
FIG. 4 is a schematic cross-sectional view of the crank shaft, a main shaft, a clutch mechanism and the like of the engine according to the first preferred embodiment of the present invention.

As illustrated in FIG. 4, a drive-side primary speed-reduction gear 24 disposed on the crank shaft 12 side engages with a driven-side primary speed-reduction gear 25 rotatably provided on the main shaft 19. The driving force generated by the driven-side primary speed-reduction gear 25 is transmitted to the main shaft 19 via a clutch mechanism 26.

The main shaft 19 has a first gear 27, a second gear 28, a third gear 29, a fourth gear 30, a fifth gear 31 and a sixth gear 32.

The main shaft 19 and the drive shaft 20 are disposed on the side opposite to the side where the balancer shaft 18 is positioned with respect to the first parallel line L1. Also, a starter motor 35 is provided on the side opposite to the side where the balancer shaft 18 is located with respect to the first parallel line L1, and the starter motor 35 is disposed in the vicinity of the lower end of the cylinder 15. The starter motor 35, the main shaft 19 and the drive shaft 20 are arranged in this order from the vicinity of the lower end of the cylinder 15.

The starter motor 35 engages with a connecting gear of the crank shaft 12 via a not-shown starter gear and idler shaft. This arrangement allows the crank shaft 12 to rotate via the idler shaft when the starter motor 35 is driven.

In this structure, since the shaft center O1 of the cylinder 15 is offset to one side with respect to the shaft center O2 of the crank shaft 12 and the balancer shaft 18 is provided on the side where the cylinder shaft center O1 is offset, it is possible to dispose the balancer shaft 18 close to the cylinder shaft center O1. As a result, a center of gravity G1 of the crank shaft 12, a center of gravity G2 of the balancer shaft 18 and a center of gravity G3 of the cylinder 15 are positioned close to one another, and the mass is thus centralized.

The mass can be further centralized by disposing the balancer weight rotational track 18d close to the lower end of the cylinder 15.

Since the main shaft 19 and the drive shaft 20 are disposed on the side opposite to the side where the balancer shaft 18 is positioned with respect to the first parallel line L1, balanced disposition of the respective shafts 18, 19 and 20 is achieved and the mass is thus further centralized. Also, since the balancer shaft 18 does not interfere with the main shaft 19, the main shaft 19 can be disposed in an upper position. This positioning prevents the clutch mechanism 26 provided at the end of the main shaft 19 from dipping into the oil.

Since the starter motor 35 is provided on the side opposite to the side where the balancer shaft 18 is located with respect to the first parallel line L1 (at the back of the cylinder 15) and the starter motor 35 is disposed in the vicinity of the lower end of the cylinder 15, compact arrangement of the components having a reduced front-to-rear length of the engine 11 is achieved and the mass is thus centralized. Also, in the structure in which the starter motor 35 is positioned at the back of the cylinder 15, the possibility that the starter motor 35 is drenched with water is lower than the case where the starter motor 35 is positioned in front of the engine 11.

The compact structure of the engine 11 offers an enlarged space for mounting an intake system located above the balancer shaft 18 and the starter motor 35.

As illustrated in FIG. 3, the balancer weight 18c of the balancer shaft 18 is inserted between the pair of the crank webs 12a of the crank shaft 12 such that the balancer weight 18c and the crank web 12a are overlapped with each other as viewed from the side. As a result, the shaft distance between the balancer shaft 18 and the crank shaft 12 is decreased, thereby providing a compact structure of the engine 11.

Second Preferred Embodiment

Figure 6:
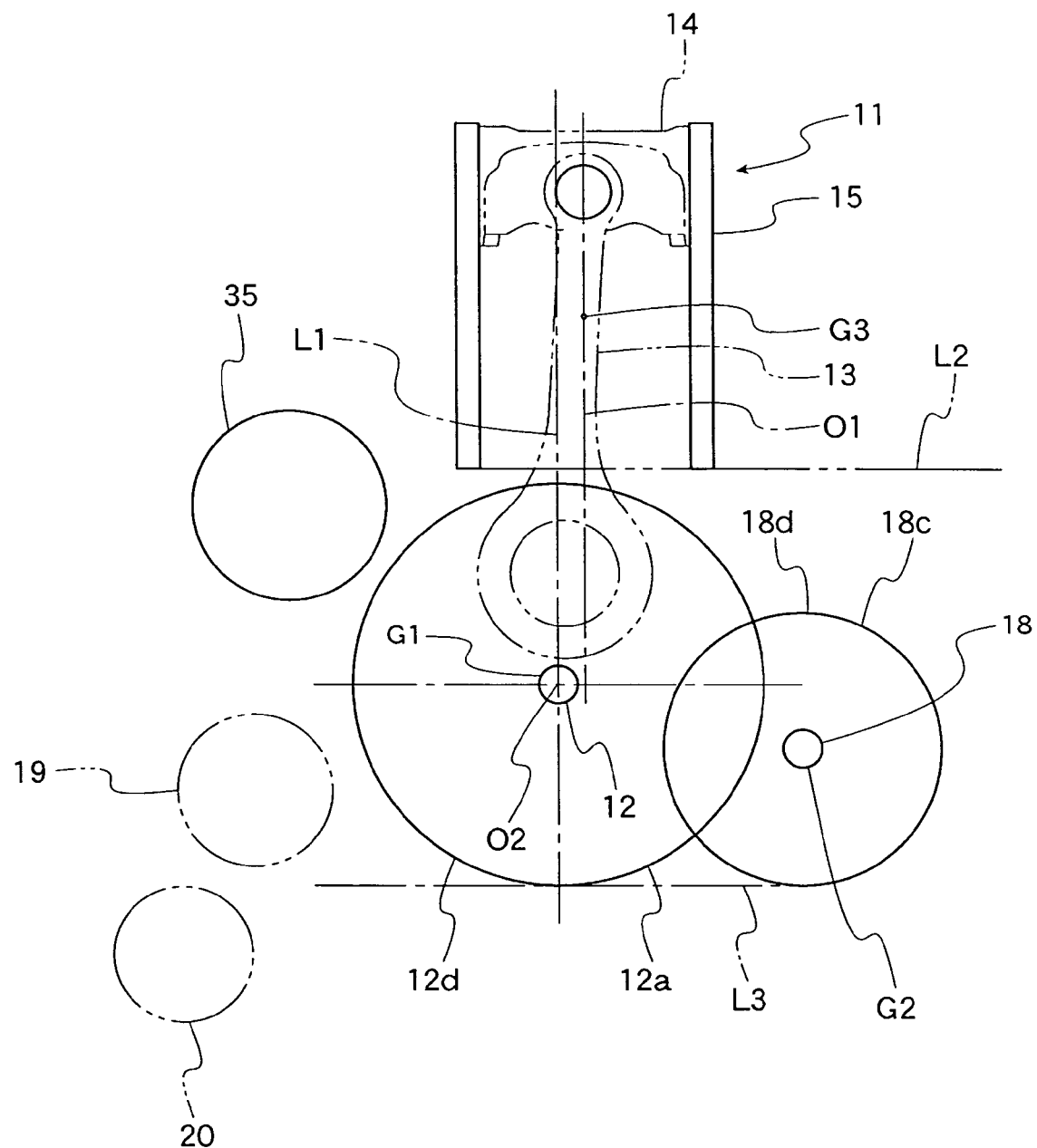
FIG. 6 is a schematic view of a second preferred embodiment of the present invention corresponding to FIG. 5.

FIG. 6 illustrates a second preferred embodiment according to the present invention.

The second preferred embodiment is different from the first preferred embodiment in that the balancer shaft 18 is disposed in a different position. In this preferred embodiment, the rotational track 18d of the balancer weight 18c is positioned close to the second vertical line L3 between the first vertical line L2 and the second vertical line L3.

In this preferred embodiment, it is also possible to centralize the mass and to reduce the front-to-rear length of the engine 11.

Since the other structure and operation in this preferred embodiment are preferably similar to those in the first preferred embodiment, explanation thereof is not repeated herein.

Third Preferred Embodiment

Figure 7:
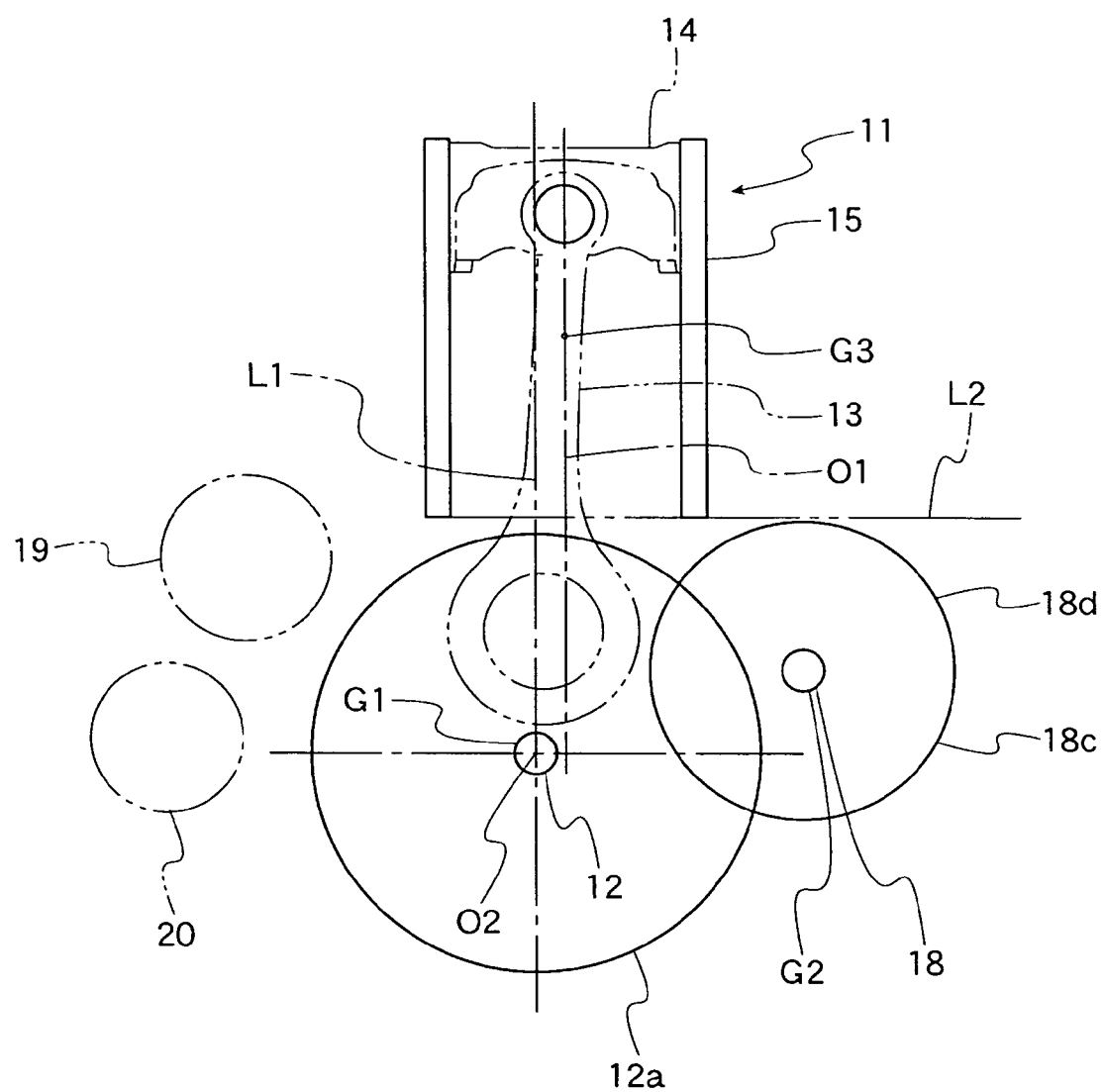
FIG. 7 is a schematic view of a third preferred embodiment of the present invention corresponding to FIG. 5.

FIG. 7 illustrates a third preferred embodiment according to the present invention.

In the third preferred embodiment of the present invention, the main shaft 19 is disposed at the position where the starter motor 35 is located (near the lower end of the cylinder 15) in the first preferred embodiment, and the drive shaft 20 is provided close to the main shaft 19.

In this structure, it is possible to dispose the main shaft 19 in a further upper position and thus centralize the mass. Also, the front-to-rear length of the engine 11 can be reduced.

Since the other structure and operation in this preferred embodiment are similar to those in the first preferred embodiment, explanation thereof is not repeated herein.

While the invention is preferably applied to the engine 11 used for a motorcycle in the above-described preferred embodiments, the invention is clearly applicable to other engines used in other applications. The engine type is not limited to a single-cylinder 4-valve engine, but may be other types.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An engine comprising:
   a crank shaft having a shaft center;
   a cylinder having a shaft with a center that is offset to one side with respect to the shaft center of the crank shaft; and
   a balancer shaft that is disposed on a side where the cylinder shaft center lies with respect to a first parallel line which intersects with the crank shaft center and extends substantially parallel to the cylinder shaft center, wherein the balancer shaft consists of a single balancer shaft.

2. An engine as set forth in claim 1, wherein the balancer shaft has a balancer weight rotational track that is positioned close to a lower end of the cylinder.

3. An engine as set forth in claim 1, wherein the balancer shaft has a balancer weight rotational track that is disposed between a first vertical line which is substantially perpendicular to the first parallel line and passes a lower end of the cylinder and a second vertical line vertically extending from an intersection between the first parallel line and a crank web rotational track.

4. An engine as set forth in claim 1, further comprising a main shaft and a drive shaft which are disposed on a side that is opposite to the side where the balancer shaft is positioned with respect to the first parallel line.

5. An engine as set forth in claim 1, further comprising a starter motor disposed on a side that is opposite to the side where the balancer shaft is positioned with respect to the first parallel line, and the starter motor is disposed in the vicinity of a lower end of the cylinder.

6. An engine as set forth in claim 1, further comprising a starter motor, a main shaft and a drive shaft which are disposed on a side opposite to the side where the balancer shaft is positioned with respect to the first parallel line such that the starter motor, the main shaft and the drive shaft are arranged in this order from the vicinity of the lower end of the cylinder.

7. An engine as set forth in claim 1, wherein the engine is a single-cylinder 4-cycle and 4-valve engine.

8. An engine as set forth in claim 1, wherein the shaft center of the cylinder is inclined toward a front of the engine by a predetermined angle.

9. An engine as set forth in claim 1, wherein the crank shaft has a crank web rotational track and the balancer shaft has a balancer weight rotational track which overlaps with the crank web rotational track as viewed from the crank shaft.

10. An engine as set forth in claim 1, further comprising a balancer gear and a crank gear having substantially the same diameter.

11. An engine as set forth in claim 1, further comprising a pair of crank webs of the crank shaft and a balancer weight of the balancer shaft disposed between the pair of crank webs of the crank shaft.

12. A vehicle comprising an engine, the engine including:
    a crank shaft having a shaft center;
    a cylinder having a shaft with a center that is offset to one side with respect to the shaft center of the crank shaft; and
    a balancer shaft that is disposed on a side where the cylinder shaft center lies with respect to a first parallel line which intersects with the crank shaft center and extends substantially parallel to the cylinder shaft center, wherein the balancer shaft consists of a single balancer shaft.

13. A vehicle as set forth in claim 12, wherein the balancer shaft has a balancer weight rotational track that is positioned close to a lower end of the cylinder.

14. A vehicle as set forth in claim 12, wherein the balancer shaft has a balancer weight rotational track that is disposed between a first vertical line which is substantially perpendicular to the first parallel line and passes a lower end of the cylinder and a second vertical line vertically extending from an intersection between the first parallel line and a crank web rotational track.

15. A vehicle as set forth in claim 12, further comprising a main shaft and a drive shaft which are disposed on a side that is opposite to the side where the balancer shaft is positioned with respect to the first parallel line.

16. A vehicle as set forth in claim 12, further comprising a starter motor disposed on a side that is opposite to the side where the balancer shaft is positioned with respect to the first parallel line, and the starter motor is disposed in the vicinity of a lower end of the cylinder.

17. A vehicle as set forth in claim 12, further comprising a starter motor, a main shaft and a drive shaft which are disposed on a side opposite to the side where the balancer shaft is positioned with respect to the first parallel line such that the starter motor, the main shaft and the drive shaft are arranged in this order from the vicinity of the lower end of the cylinder.

18. A vehicle as set forth in claim 12, wherein the engine is a single-cylinder 4-cycle and 4-valve engine.

19. A vehicle as set forth in claim 12, wherein the vehicle is a straddle-type vehicle.

20. A vehicle as set forth in claim 12, wherein the vehicle is a motorcycle.

* * * * *